United States Patent [19]

Hengesbach

[11] Patent Number: 4,473,328
[45] Date of Patent: Sep. 25, 1984

[54] ASPIRATOR PROBE FOR SAND BLASTING APPARATUS

[76] Inventor: Robert W. Hengesbach, 7886 Munson Rd., Mentor, Ohio 44060

[21] Appl. No.: 388,469

[22] Filed: Jun. 14, 1982

[51] Int. Cl.³ .............................................. B65G 53/50
[52] U.S. Cl. .................................... 406/152; 222/630; 239/310
[58] Field of Search ............... 222/464, 335, 630, 195, 222/529; 141/67, 392; 239/310, 311, 318; 406/152, 153; 137/540

[56] References Cited

U.S. PATENT DOCUMENTS

| | | |
|---|---|---|
| 1,180,960 | 4/1916 | Urie et al. . |
| 1,605,617 | 11/1926 | Ruemelin ........................... 406/152 |
| 1,948,533 | 2/1929 | Neely . |
| 2,072,555 | 3/1935 | Hengesbach et al. ............... 137/540 |
| 2,133,149 | 10/1938 | Poncelet . |
| 2,176,577 | 10/1939 | Tirrell . |
| 3,032,929 | 5/1962 | Glesener . |
| 3,416,844 | 12/1968 | Steidley .............................. 406/152 |
| 3,577,681 | 5/1971 | Waag . |
| 3,632,046 | 1/1972 | Hengesbach ....................... 239/318 |
| 3,756,273 | 9/1973 | Hengesbach ....................... 137/540 |
| 4,131,319 | 12/1978 | Klos .................................... 406/152 |

FOREIGN PATENT DOCUMENTS 604090 4/1960 Italy .................................... 406/153

OTHER PUBLICATIONS

Tri-Con, Inc., brochure entitled "#700 Abrasive Blaster," 11/1/82.

Primary Examiner—Houston S. Bell, Jr.
Attorney, Agent, or Firm—David A. Burge

[57] ABSTRACT

An aspirator probe for a sand blasting apparatus and the like has a tube-within-a-tube construction wherein the inner tube is a delivery tube for supplying a mixture of sand and air to a delivery hose, and the outer tube is an air supply tube which surrounds the majority of the length of the delivery tube. The delivery tube has a lower end which may be coextensive with the lower end of the air supply tube, or recessed within the lower end region of the air supply tube. The delivery tube has an upper end portion which projects upwardly beyond the upper end of the air supply tube for connection with the delivery hose. A communicating formation provides a passage for communicating both tubes to introduce, as by aspiration, a flow of air into the flow of sand which is being drawn into and through the delivery tube. In one embodiment the communicating formation takes the form a non-coextensive arrangement of the lower ends of the delivery and air supply tubes. In another embodiment the communicating formation takes the form of a hole, slot or notch provided in a side wall portion of the delivery tube at a location in proximity to the lower end of the delivery tube. In still another embodiment the communicating formation takes the form of a notch or relief provided on the lower end of the delivery tube.

22 Claims, 12 Drawing Figures

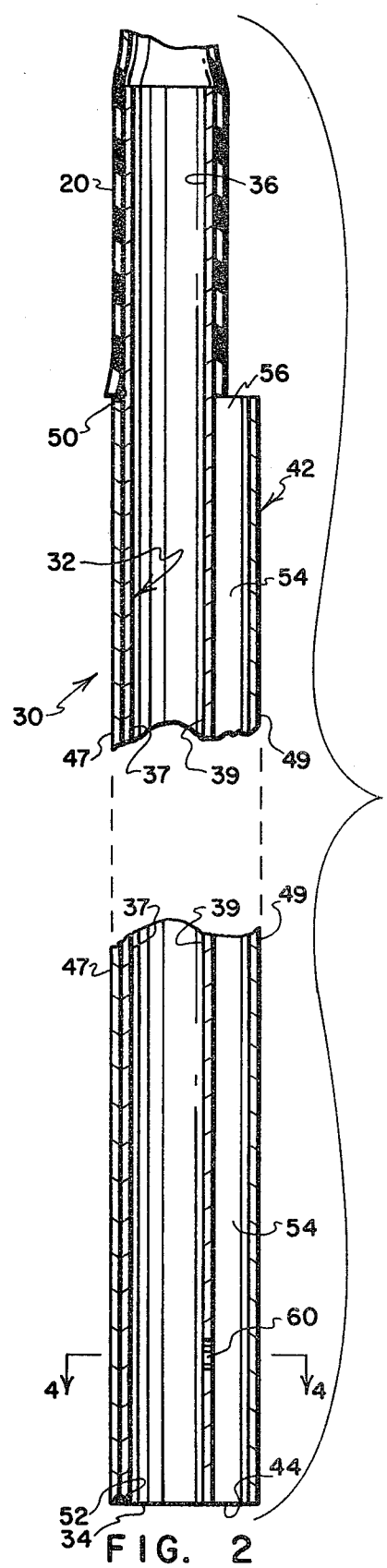
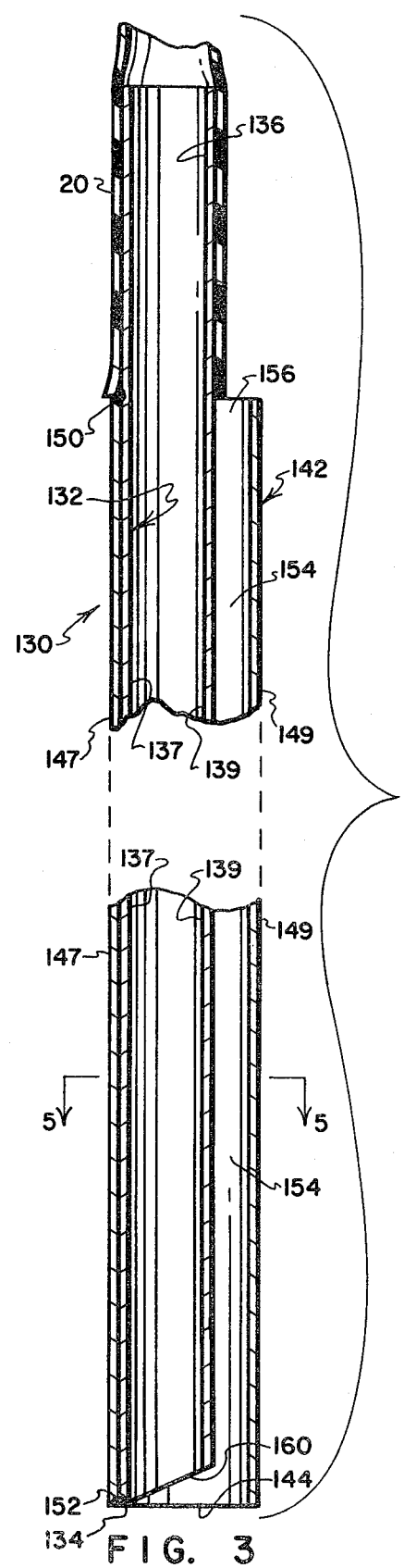

ASPIRATOR PROBE FOR SAND BLASTING APPARATUS

BACKGROUND OF THE INVENTION

1. Field of the Invention

The present invention relates to sandblasting apparatus and the like, and, more particularly, to an improved aspirator probe for use in supplying a suitable mixture of materials such as sand and air from a reservoir through a delivery hose to such devices as a sandblast control nozzle.

2. Prior Art

It is known to provide a portable sandblasting apparatus with a probe which can be inserted into a reservoir of sand for supplying a mixture of sand and air through a delivery hose to a control nozzle. The control nozzle is supplied with pressurized propulsion fluid such as compressed air and operates, as by aspiration, to draw a vacuum in the delivery hose and in the probe, whereby ambient air pressure moves sand through the probe and through the delivery hose to the nozzle. The nozzle introduces the sand into the flow of propulsion fluid and effects a forceful delivery of the sand in a controlled direction for treating workpiece surfaces.

One proposed probe construction includes two parallel tubes of unequal length positioned side-by-side and welded together. One of the tubes is longer than the other, and its upper end projects upwardly beyond the upper end of the other tube. The lower ends of both tubes are coextensive. The longer of the tubes is a delivery tube for supplying a mixture of sand and air through a delivery hose to a control nozzle. The shorter of the tubes is an air supply tube. Aligned holes are drilled through adjacent walls of the delivery and air supply tubes to provide a port which communicates both of the tubes. When the control nozzle is activated, pressurized propulsion fluid passing through the nozzle creates an aspiration effect which draws a vacuum in the delivery hose and in the delivery tube. Ambient air pressure operates on sand in the container to force sand into and through the delivery tube, and through the delivery hose to the control nozzle. As sand rises in the delivery tube, an additional aspiration effect operating in the probe causes air to be drawn into the delivery tube from the air supply tube through the communicating port. The air which is drawn into the delivery tube mixes with the sand to provide a sand and air mixture that is supplied to the control nozzle. The aspiration effect which operates within the probe provides a means of metering sand and air for supply to the control nozzle. Since aspiration takes place within the probe, the probe is known in the art as an aspirator probe.

One problem with the foregoing aspirator probe proposal is that the operation of the probe tends to change undesirably with variations in the pressure of the propulsion fluid which is supplied to the control nozzle. A further problem lies in a pulsating, relatively uneven delivery of sand which occasionally results with use of the probe. Another problem is that, in order to drill a communicating hole through abutting walls of the side-by-side delivery and air supply tubes, it is necessary to drill an additional hole through the opposite wall of one of the tubes in order to gain access to the area where a hole can be drilled through abutting walls of the two tubes. The drilling of this additional hole adds to fabrication cost. The presence of this additional hole is also found, in some instances, to detract from proper operation of the probe.

SUMMARY OF THE INVENTION

The present invention overcomes the foregoing and other drawbacks of prior proposals by providing an aspirator probe of novel construction which is relatively inexpensive to fabricate and which exhibits improved performance.

In accordance with the preferred practice of the present invention, a mixture delivery tube is surrounded along a majority of its length by an air supply tube which has an inner diameter that is larger than the outer diameter of the delivery tube. The delivery tube is longer than the air supply tube and has an upper end which projects upwardly beyond the upper end of the air supply tube for connection to a delivery hose. The delivery tube has a lower end which is either coextensive with or recessed within the lower end of the air supply tube. A communicating formation is provided for permitting a restricted flow of air to pass from the air supply tube into the delivery tube. In one embodiment the communicating formation takes the form of a non-coextensive arrangement of the lower ends of the delivery and air supply tubes. In another embodiment the communicating formation takes the form of a hole, slot or notch provided in a side wall portion of the delivery tube. In still another embodiment the communicating formation takes the form a notch or relief provided on the lower end of the delivery tube.

The preferred manner in which to fabricate a probe embodying features of the present invention is to utilize a piece of elongate tubing of relatively large diameter to form the air supply tube, and a piece of elongate tubing of relatively smaller diameter to form the delivery tube. If the communicating formation is to take the form of a hole, slot, notch or relief formed on the delivery tube, it is formed before the two tubes are assembled. Assembly is effected by inserting the delivery tube into the air supply tube, whereafter the tubes are joined as by bonding or welding.

An alternate fabrication technique permits a tube-within-a-tube configuration to be fabricated from a single piece of elongate tubing which is deformed by folding a longitudinally extending wall portion inwardly to form an inner delivery tube which is surrounded by an outer air supply tube. The resulting structure is joined along its length to close and seal a longitudinally-extended seam. A communicating formation is preferably formed prior to deformation of the original piece of elongate tubing.

BRIEF DESCRIPTION OF THE DRAWINGS

The foregoing and other features of the present invention will be better understood by referring to the description of the preferred embodiment and claims which follow, taken together with the accompanying drawings, wherein:

FIG. 2 is a sectional view, on an enlarged scale, as seen from a plane indicated by a line 2—2 in FIG. 1;

FIG. 3 is a sectional view similar to FIG. 2 of an alternate form of aspirator probe;

DESCRIPTION OF THE PREFERRED EMBODIMENT

Figures 1, 8:
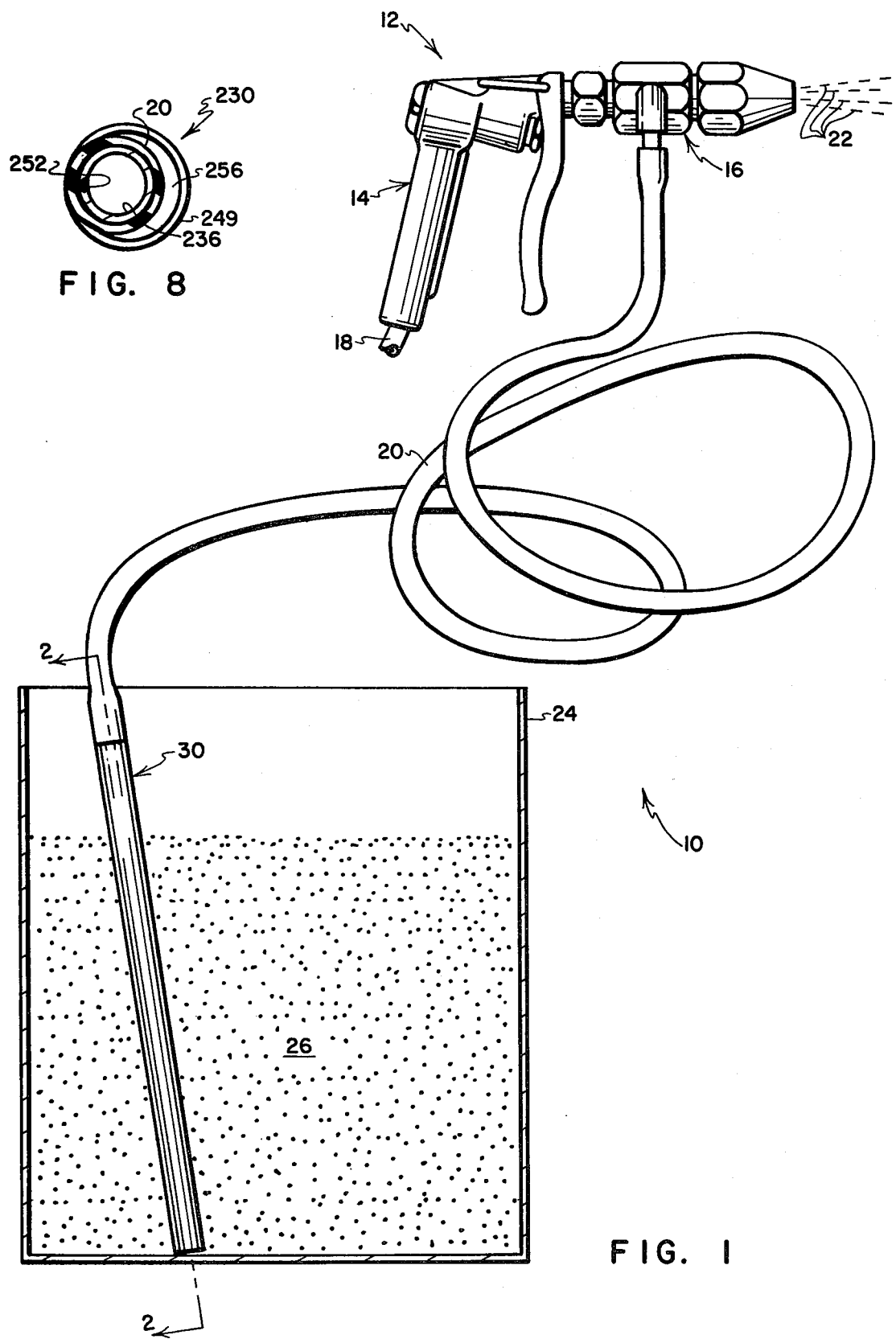
FIG. 1 is a side elevational view of a sand blasting apparatus including an aspirator probe which embodies features of the present invention, with the probe being shown inserted into a sand reservoir, and with the reservoir being shown in cross section.
FIGS. 7 and 8 are sectional views as seen from planes indicated by lines 7—7 and 8—8 in FIG. 6.

Referring to FIG. 1, a sand blasting apparatus embodying the preferred practice of the present invention is indicated generally by the numeral 10. The apparatus 10 includes a control nozzle indicated generally by the numeral 12. The control nozzle 12 includes a conventional trigger-operated control valve 14 of the general type described in U. S. Pat. Nos. 3,756,273, 3,632,046 and 2,072,555, the disclosures of which are incorporated herein by reference. The control nozzle 12 additionally includes a sandblast nozzle assembly 16 which can take any of a variety of commercially available forms, one being a nozzle assembly sold under the model designation 710 by Tri-Con, Inc., Cleveland, Ohio 44132.

A supply hose 18 connects with the control valve 14 for supplying pressurized propulsion fluid such as pressurized air to the control valve 14. A delivery hose 20 connects with the nozzle assembly 16 for delivering a mixture of sand and air to the nozzle assembly 16. When the control valve 14 is activated, pressurized propulsion fluid from the supply hose 18 is delivered through the control valve 14 to the nozzle assembly 16. As the propulsion fluid passes through the nozzle assembly 16, an aspiration effect is created. The aspiration effect draws a vacuum in the delivery hose 20, and causes materials supplied through the delivery hose 20, namely a mixture of sand and air, to be drawn into the nozzle assembly 16 where these materials are introduced into the flow of propulsion fluid for discharge in a controlled direction, as indicated by the numeral 22.

An open-top container 24 is provided for housing a reservoir of sand 26. An aspirator probe 30 is positioned to extend into the sand supply 26. The probe 30 connects with the delivery hose 20 and serves to provide a regulated mixture of sand and air in a manner which will be described. While the container 24 is shown as taking the form of a barrel-like structure, it will be understood that the container 24 can take substantially any form which defines a suitable reservoir for sand or other abrasive material which is to be supplied by aspiration to the nozzle assembly 16. While the container 24 has been depicted as housing a supply of sand 26, it will be understood that other abrasive materials and/or fluids may be provided within the container 24 for use instead of or together with sand.

Figure 4:
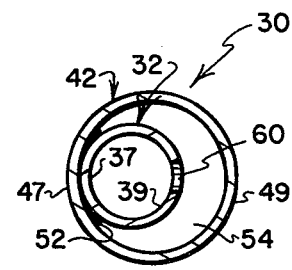
FIGS. 4 and 5 are sectional views as seen from planes indicated by lines 4—4 and 5—5 in FIGS. 2 and 3, respectively.

Referring to FIGS. 2 and 4, the aspirator probe 30 includes a mixture delivery tube 32 and an air supply tube 42. The tubes 32, 42 have lower ends 34, 44 which are substantially coextensive, i.e., neither projects downwardly to any appreciable degree beyond the other. The delivery tube 32 is longer than the air supply tube 42 and has an upper end region 36 which extends upwardly beyond the upper end 46 of the air supply tube 42. The delivery hose 20 has one of its ends stretched to extend over and sealingly engage the upper end region 36 of delivery tube 32.

The mixture delivery tube 32 has opposed left and right longitudinally-extending sidewall portions which are designated by the numerals 37, 39. The air supply tube 42 has opposed left and right longitudinally-extending sidewall portions which are designated by the numerals 47, 49. The left sidewall portion 37 of the mixture delivery tube 32 abuttingly engages the left sidewall portion 47 of the air supply tube 42. Upper and lower bonds 50, 52 formed by welding or other suitable joining techniques are located at the upper and lower ends of the left sidewall portion 47 and serve to rigidly connect the tubes 32, 42.

The right sidewall portions 39, 49 are spaced from each other by virtue of the relative differences in diameters of the tubes 32, 42. The space between the sidewall portions 39, 49 defines an air supply passage 54 of generally horseshoe-shaped cross section having an open upper end 56 for admitting ambient air into the passage 54.

A communicating formation 60 extends through the right sidewall 39 of the delivery tube 32. While the formation 60 is illustrated as taking the form of a hole, this formation can take the form of a slot or notch or the like which will provide a passage of suitable size through the sidewall 39. The hole 60 is located in proximity to the coextensive lower ends 34, 44 of the tubes 32, 42. The hole 60 permits the passage of a restricted flow of air from the air supply tube 42 into the delivery tube 32 as sand is being drawn through the delivery tube 32 during activation of the control valve 14. The rate of flow of air through the hole 60 is determined by the extent of an aspiration effect which is created by the flow of sand through the delivery tube 32 past the hole 60. As the rate of flow of the sand increases or diminishes, the extent of the aspiration effect (and hence the rate of flow of air through the hole 60) varies accordingly. By this arrangement, the probe 30 serves to provide a properly metered mixture of sand and air for delivery to the nozzle assembly 16.

An aspiration probe of the foregoing type which has been tested extensively and found to perform particularly well utilizes a delivery tube 32 of about 45 cm in length with an inner diameter of about 0.55 cm and an outer diameter of about 0.80 cm. The hole 60 has a diameter of about 0.25 cm and is located about 2 cm from the lower end 34 of the tube 32. The air supply tube 42 is about 41 cm in length with an inner diameter of about 1.25 cm and an outer diameter of about 1.50 cm. A probe of this configuration was found to deliver a suitable mixture of sand and air to a control nozzle 12 when pressurized propulsion fluid having a pressure within the range of 60 to 100 psi is supplied to the nozzle 12 through the hose 18. Optimum performance of the probe 30 for any predetermined set of operating conditions can be obtained through experimentation to determine the most suitable size and location for the hole 60, and the most suitable sizes and lengths of the tubes 32, 42.

The probe 30 is relatively inexpensive to manufacture inasmuch as the formation used to communicate the tubes 32, 42 is a single hole which can be drilled in the delivery tube 32 before the tubes 32, 42 are welded together. Tests have shown the probe 30 to provide a uniform non-pulsating delivery of sand, and to be desirably less sensitive than previously-proposed probe constructions to variations in the pressure of the propulsion fluid delivered to the valve 14 through the supply hose 18, whereby operation and versatility of the probe 30 are improved over that achieved with prior aspirator probe proposals.

Figure 5:
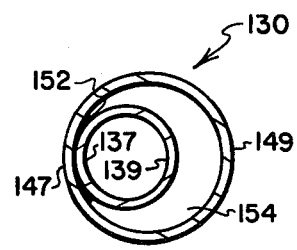

Referring to FIGS. 3 and 5, an alternate form of probe is indicated generally by the numeral 130. The probe 130 may be substituted for the probe 30, and connects with the hose 20 in the same manner as the probe 30. The probe 130 includes a mixture delivery tube 132 and an air supply tube 142. The tubes 132, 142 have lower end portions 134, 144 which are substantially coextensive, i.e., neither projects downwardly to any appreciable degree beyond the other. The delivery tube 132 is longer than the air supply tube 142 and has an upper end region 136 which projects beyond the upper end 146 of the air supply tube 142. The delivery hose 20 is stretched to extend over and sealingly engage the upper end region 136 of delivery tube 132.

Referring to FIGS. 3 and 5, the mixture delivery tube 132 has opposed left and right longitudinally-extending sidewall portions which are designated by the numerals 137, 139. The air supply tube 142 has opposed left and right longitudinally-extending sidewall portions which are described by the numerals 147, 149. The left sidewall portion 137 of the mixture delivery tube 132 abuttingly engages the left sidewall portion 147 of the air supply tube 142. Upper and lower bonds 150, 152 formed by welding or other suitable joining techniques are located at the upper and lower ends of the left sidewall portion 147 and serve to rigidly connect the tubes 132, 142.

The right sidewall portions 139, 149 are spaced from each other by virtue of the relative differences in diameters of the tubes 132, 142. The space between the sidewall portions 139, 149 defines an air supply passage 154 of generally horseshoe-shaped cross section having an open upper end 156 for admitting ambient air to the passage 154.

A communicating formation in the form of a tapered or relieved or notched end formation 160 is provided on the lower end 134 of the delivery tube 132. The relieved end wall 160 extends at an angle of about 30 degrees to the plane of the end 144 of the air supply tube 142 and permits the passage of a restricted flow of air from the air supply tube 142 into the delivery tube 132 as sand is being drawn through the delivery tube 132 during activation of the control valve 14. The rate of flow of air across the relieved end wall 160 from the passage 154 to the delivery tube 132 is determined by the extent of an aspiration effect which is created by the flow of sand into the delivery tube 132 past the tapered end 160. As the rate of flow of the sand increases or diminishes, the extent of the aspiration effect (and hence the rate of flow of air from the passage 154 into the delivery tube 132) varies accordingly. By this arrangement, the probe 130 serves to provide a properly metered mixture of sand and air for delivery to the nozzle assembly 16.

The probe 130 is relatively inexpensive to manufacture inasmuch as the formation used to communicate the tubes 132, 142 is simply a tapered, relieved or notched end which can be formed on the delivery tube 132 before the tubes 132, 142 are welded or otherwise together. Tests have shown the probe 130 to provide a uniform non-pulsating delivery of sand, and to be less sensitive than previously-proposed probe constructions to variations in the pressure of the propulsion fluid delivered to the valve 14 through the supply hose 18, whereby operation and versatility of the probe 130 are improved over that achieved with prior aspirator probe proposals.

Figure 6:
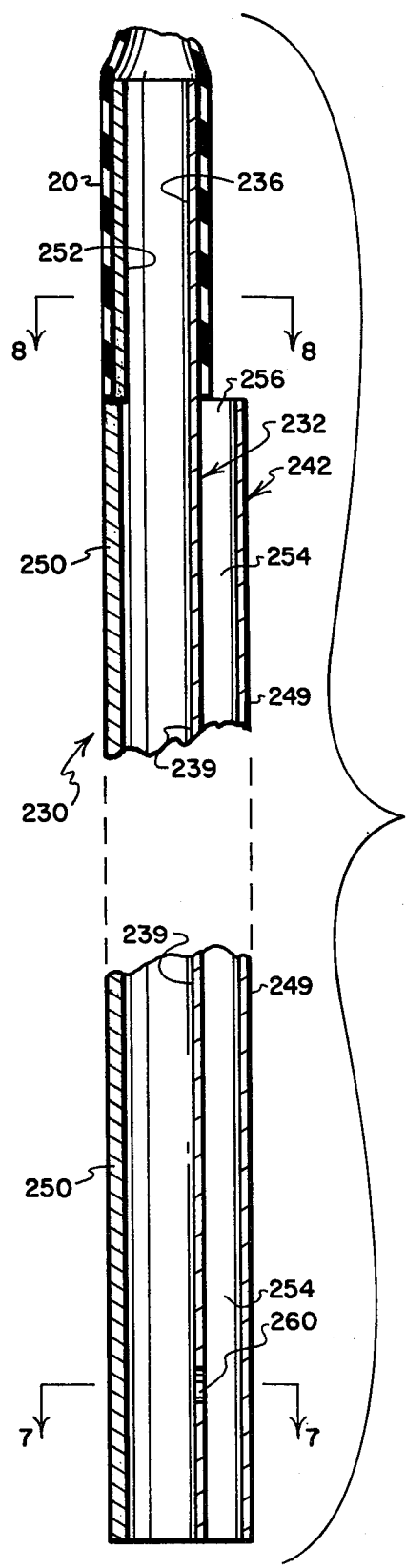
FIG. 6 is a sectional view similar to FIGS. 2 and 3 showing still another alternate form of aspirator probe.
Figure 7:
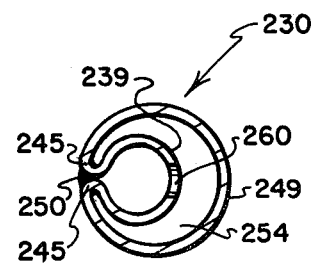

Referring to FIGS. 6–8, another alternative form of probe is indicated generally by the numeral 230. The probe 230 may be substituted for the probe 30 or the probe 130, and connects with the hose 20 in the same manner as the probes 30, 130. While the probe 230 includes a structure which defines a mixture delivery tube 232 and an air supply tube 242 which function identically to the tubes 32, 42 of the probe 30, the tubes 232, 242 are formed from a single piece of elongate tubing which is folded inwardly upon itself, as is best seen in FIG. 7, to provide the desired tube-within-a-tube construction. The tubes 232, 242 have lower ends 234, 244 which are substantially coextensive, i.e., neither projects downwardly to any appreciable degree beyond the other. The delivery tube 232 is longer than the air supply tube 242 and has an upper end region 236 which is configured to project beyond the upper end 246 of the air supply tube 242. The delivery hose 20 is stretched to extend over and sealingly engage the upper end region 236 of delivery tube 232.

The tubes 232, 242 have longitudinally-extending sidewall portions which are designated by the numerals 239, 249. The tubes 232, 242, have U-shaped formations 245 which define their left longitudinally-extending sidewall portions. A longitudinally-extending weld or other suitable form of bond 250 rigidly connects the U-shaped formations 245 and closes the longitudinally-extending seam between the formations 245. A weld or other suitable form of bond 252 is provided to close a longitudinally-extending seam on the left side of the upper end region 236 of the delivery tube 232.

The right sidewall portions 239, 249 are spaced from each other by virtue of the relative differences in diameters of the tubes 232, 242. The space between the sidewall portions 239, 249 defines an air supply passage 254 of generally horseshoe-shaped cross section having an open upper end 256 for admitting ambient air to the passage 254.

A communicating formation 260 extends through the right sidewall 239 of the delivery tube 232. While the formation 260 is illustrated as taking the form of a hole, this formation can take the form of a slot or notch or the like which will provide a passage of suitable size through the sidewall 239. The hole 260 is located in proximity to the coextensive lower ends 234, 244 of the tubes 232, 242. The hole 260 permits the passage of a restricted flow of air from the air supply tube 242 into the delivery tube 232 as sand is being drawn through the delivery tube 232 during activation of the control valve 14. The rate of flow of air through the hole 260 is determined by the extent of an aspiration effect which is created by the flow of sand through the delivery tube 232 past the hole 260. As the rate of flow of the sand increases or diminishes, the extent of the aspiration effect (and hence the rate of flow of air through the holes 260) varies accordingly. By this arrangement, the probe 30 serves to provide a properly metered mixture of sand and air for delivery to the nozzle assembly 16.

The probe 230 is relatively inexpensive to manufacture inasmuch as it is formed from a single piece of metal. The hole 260 (or, alternatively a notch or other type of communicating formation) can be drilled (or otherwise formed) before metal is deformed to create the tubes 232, 242, whereafter the weld 250 is made. Tests have shown the probe 230 to be less sensitive than previously-proposed probe constructions to variations in the pressure of the propulsion fluid delivered to the valve 14 through the supply hose 18, whereby operation and versatility of the probe 230 are improved over that achieved with prior aspirator probe proposals.

Figure 9:
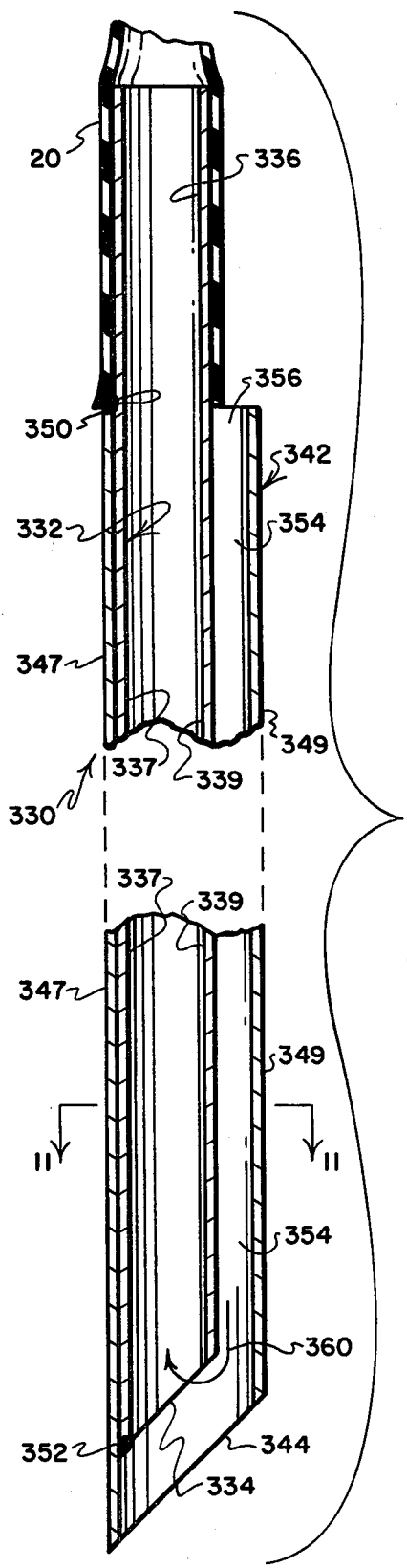
FIGS. 9 and 10 are sectional views similar to FIGS. 2, 3 and 6 showing two additional alternate forms of aspirator probes; and, FIGS. 11 and 12 are sectional views as seen from planes indicated by lines 11—11 and 12—12 in FIGS. 9 and 10, respectively.
Figure 11:
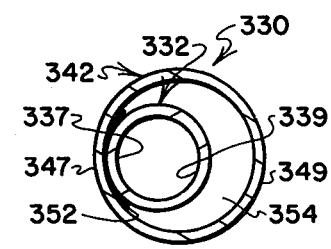

Referring to FIGS. 9 and 11, another alternate form of aspirator probe is indicated generally by the numeral 330. The probe 330 may be substituted for the probes 30, 130 or 230, and connects with the hose 20 in the same manner as the probes 30, 130, 230. The probe 330 includes a mixture delivery tube 332 and an air supply tube 342. The tubes 332, 342 have lower ends 334, 344 which are inclined and extend in spaced parallel planes. Stated in another way, the lower ends 334, 344 of the probe 330 differ from the arrangements of the previously described embodiments in that they are not substantially coextensive. The lower end 334 of the delivery tube 332 is recessed inside the lower end 344 of the supply tube 332. The delivery tube 332 is longer than the air supply tube 342 and has an upper end region 336 which extends upwardly beyond the upper end 346 of the air supply tube 342. The delivery hose 20 has one of its ends stretched to extend over and sealingly engage the upper end region 336 of delivery tube 332.

The mixture delivery tube 332 has opposed left and right longitudinally-extending sidewall portions which are designated by the numerals 337, 339. The air supply tube 342 has opposed left and right longitudinally-extending sidewall portions which are designated by the numerals 347, 349. The left sidewall portion 337 of the mixture delivery tube 332 abuttingly engages the left sidewall portion 347 of the air supply tube 342. Upper and lower bonds 350, 352 formed by welding or other suitable joining techniques are located at the upper and lower ends of the left sidewall portion 347 and serve to rigidly connect the tubes 332, 342.

The right sidewall portions 339, 349 are spaced from each other by virtue of the relative differences in diameters of the tubes 332, 342. The space between the sidewall portions 339, 349 defines an air supply passage 354 of generally horseshoe-shaped cross section having an open upper end 356 for admitting ambient air into the passage 354.

The non-coextensive arrangement of the lower ends 334, 344 provides a communicating passage indicated generally by the arrow 360 which permits a restricted flow of air to travel from the air supply tube 342 into the delivery tube 332 as sand is being drawn into and through the delivery tube 332 during activation of the control valve 14. The rate of flow of air from the air supply tube 342 to the delivery tube 332 is determined by the extent of an aspiration effect which is created by the flow of sand into the delivery tube 332 past the lower end of the air supply tube 342. As the rate of flow of the sand increases or diminishes, the extent of the aspiration effect varies accordingly. By this arrangement, the probe 330 serves to provide a properly metered mixture of sand and air for delivery to the nozzle assembly 16.

In the probe embodiment 330 of FIGS. 9 and 11, the lower end of the left side wall 337 is shown depending below the lower end of the right side wall 349. For optimum performance, this relative arrangement is maintained while assuring that the lower end 334 of the delivery tube 332 remains recessed within the lower end region of the air supply tube 342. Good performance is also achieved where the lower end of the left side wall 337 is coextensive with (i.e., does not extend below) the lower end of the right side wall 349.

So long as the lowermost end point on the delivery tube 332 is coextensive with or extends beyond the lower end of the left side wall 337, good performance will be maintained. With this condition maintained, the parallel relationship of the angled ends 334, 344 need not be maintained. Such a non-parallel arrangement is illustrated in the embodiment of FIGS. 10 and 12.

Figure 12:
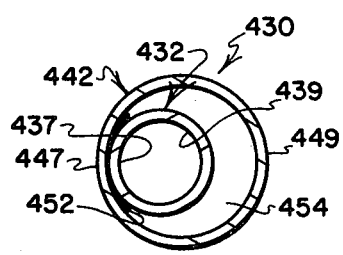
Figure 10:
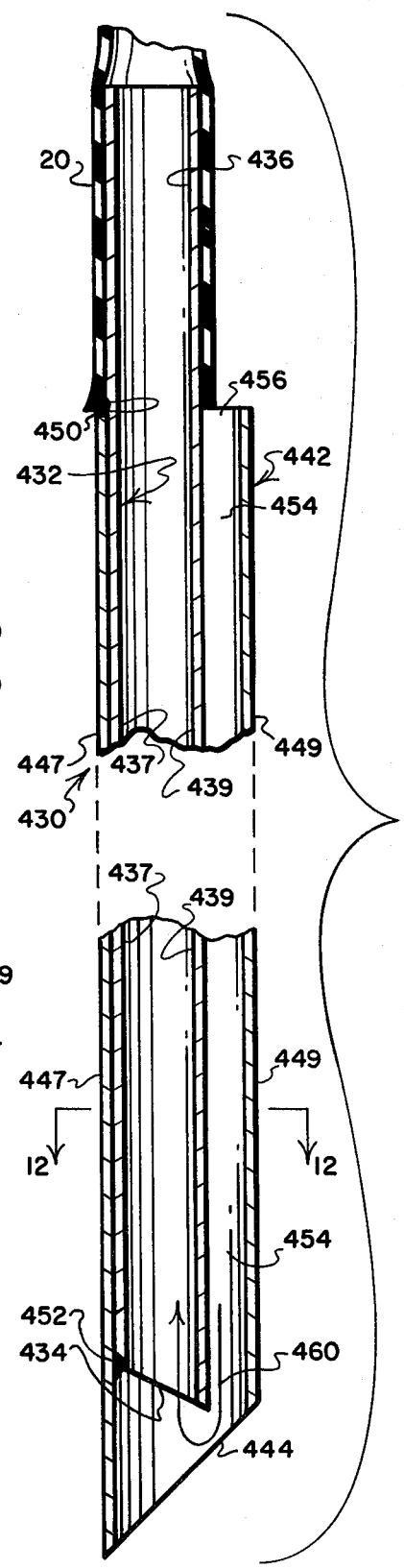

Referring to FIGS. 10 and 12, a further alternate form of aspirator probe is indicated generally by the numeral 430. The probe 430 may be substituted for the probes 30, 130, 230, or 330, and connects with the hose 20 in the same manner as the probes 30, 130, 230. The probe 230 includes a mixture delivery tube 432 and an air supply tube 442. The tubes 432, 442 have lower ends 434, 444 which are inclined and extend in intersecting planes. The lower end 434 of the delivery tube 432 is recessed inside the lower end 444 of the supply tube 432. The delivery tube 432 is longer than the air supply tube 442 and has an upper end region 436 which extends upwardly beyond the upper end 446 of the air supply tube 442. The delivery hose 20 has one of its ends stretched to extend over and sealingly engage the upper end region 436 of delivery tube 432.

The mixture delivery tube 432 has opposed left and right longitudinally-extending sidewall portions which are designated by the numerals 437, 439. The air supply tube 442 has opposed left and right longitudinally-extending sidewall portions which are designated by the numerals 447, 449. The left sidewall portion 437 of the mixture delivery tube 432 abuttingly engages the left sidewall portion 447 of the air supply tube 442. Upper and lower bonds 450, 452 formed by welding or other suitable joining techniques are located at the upper and lower ends of the left sidewall portion 447 and serve to rigidly connect the tubes 432, 442.

The right sidewall portions 439, 449 are spaced from each other by virtue of the relative differences in diameters of the tubes 432, 442. The space between the sidewall portions 439, 449 defines an air supply passage 454 of generally horseshoe-shaped cross section having an open upper end 456 for admitting ambient air into the passage 454.

The non-coextensive arrangement of the lower ends 434, 444 provides a communicating passage indicated generally by the arrow 460 which permits a restricted flow of air to travel from the air supply tube 442 into the delivery tube 432 as sand is being drawn into and through the delivery tube 432 during activation of the control valve 14. The rate of flow of air from the air supply tube 442 to the delivery tube 432 is determined by the extent of an aspiration effect which is created by the flow of sand into the delivery tube 432 past the lower end of the air supply tube 442. As the rate of flow of the sand increases or diminishes, the extent of the aspiration effect varies accordingly. By this arrangement, the probe 430 serves to provide a properly metered mixture of sand and air for delivery to the nozzle assembly 16.

While preferred types of communicating formations have been illustrated and described, it will be understood that the practice of the invention is not limited to the use of these types of formations. Instead of a single hole, a plurality of holes may be used. Instead of holes, elongate openings, grooves, slots, and the like may be employed. Instead of a relieved end formation, one or more notches or grooves may be employed.

Guidelines to be kept in mind in providing communicating formations is that they should permit a restricted flow of air to pass from the air supply tube to the delivery tube, and should operate to introduce air into the flow of sand as by aspiration. In testing the probe 30, it has been found that the hole 60 may take a diameter within a wide range from about 0.01 cm to about 0.50 cm. In testing the probe 130, it has been found that the included angle between the planes of the end formation 160 and the end wall 144 may be selected within a fairly wide range of angles; however, an angle of about 30 degrees has been found to be optimum for most sandblasting operations. Tests have also shown that, with each of the described probes, the optimum ratio of the area of the inner diameter of their delivery tubes to the area of the inner diameter of their air supply tubes is about 1:3.

While the inner and outer tubes of the described probe embodiments have been illustrated as being formed from metal, and have been described as being interconnected as by welding, it will be understood that these tubes may be formed from materials other than metal, and the tubes may be bonded together by techniques other than welding.

While features of the present invention have been described in conjunction with the delivery of a sand and air mixture for use with a sandblasting apparatus, the described aspirator probes may be employed to deliver granular substances other than sand, and/or various types of fluids. Accordingly, it will be understood that the description of the preferred use is not to be construed as limiting.

While such orientation words as "top," "bottom," "upward," and "downward" are utilized herein, it will be understood that probes embodying features of the present invention may be positioned in attitudes which are inclined from the vertical. Accordingly, it will be understood that such orientation words as are utilized herein are intended to facilitate an understanding of the relative orientation of various components and are not to be construed as limiting.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. An aspirator probe for insertion into a reservoir of flowable material for delivering a mixture of (1) the flowable material, and (2) air into a vacuum line connected between the said probe and a discharge device, as a sandblast nozzle, comprising:
    a first upstanding inside structure defining an elongated upwardly extending generally tubular delivery passage,
    said passage having an opening at its lower end to receive therein the flowable material from a reservoir when the said probe is inserted into the reservoir,
    said upstanding structure having means at the upper end thereof for facilitating connection of a vacuum line thereto,
    said passage in said structure having an opening at its upper end for delivering a mixture of flowable material and air therefrom and into a vacuum line connected to said structure,
    a second upstanding outside structure substantially surrounding said first structure in non-coaxial relation thereto and attached thereto at one side thereof, with said second structure of lesser height than said first structure,
    confronting walls of said non-coaxial first and second structures defining an elongated upwardly extending tubular air supply passage which is open at its upper end to receive ambient air, and
    air communicating means located within said second structure and in proximity to the lower end of said first inside structure for communicating said first tubular structure delivery passage with said second tubular structure air supply passage for permitting a restricted flow of air to pass from the air supply passage to the delivery passage under the influence of an aspiration effect created as material from the reservoir flows in a direction established by the delivery passage past the air communicating means.

2. The aspirator probe of claim 1 wherein the first and second structures are formed from a single piece of elongate tubing.

3. The aspirator probe of claim 2 wherein the single piece of tubing has been deformed as by folding a portion of its longitudinally-extending sidewall inwardly to define the delivery passage, and by utilizing the remainder of the sidewall in cooperation with the inwardly-folded sidewall portion to define the air supply passage such that it has a generally horseshoe-shaped cross section surrounding the delivery passage along a majority of the length of the delivery passage.

4. The aspirator probe of claim 1 wherein the ratio of the cross-sectional area of the delivery passage to the cross-sectional area of the air supply passage is about 1:3.

5. The aspirator probe of claim 1 wherein the first and second structures comprise first and second elongate tubes of unequal diameter and unequal length.

6. The aspirator probe of claim 5 wherein the communicating formation means includes at least one opening formed through a sidewall portion of the first structure at a location spaced from but in proximity to the lower end of the first structure.

7. The aspirator probe of claim 1 wherein the second structure has an open lower end.

8. The aspirator probe of claim 7 wherein the communicating formation means includes a relief formed on the lower end of the first structure.

9. The aspirator of claim 8 wherein the relief includes an end surface formed on the delivery tube and extending in a first plane, the second structure has a lower end surface which extends in a second plane which is non-coextensive with the first plane.

10. The aspirator of claim 9 wherein the first and second planes intersect at an angle of about 30 degrees.

11. The aspirator of claim 9 wherein the first and second planes extend parallel to each other.

12. The aspirator of claim 7 wherein the lower ends of the first and second structures are coextensive.

13. The aspirator of claim 7 wherein the lower ends of the first and second structures are non-coextensive.

14. An aspirator probe for insertion into a reservoir of flowable material for delivering a mixture of the material and air, the probe comprising:
(a) structure defining a delivery tube and an air supply tube arranged one within the other in non-coaxial and eccentric relation, with the delivery tube defining an upwardly-extending delivery passage and being of smaller diameter than the air supply tube, and with the air supply tube surrounding the delivery tube along a majority of the length of the delivery tube and cooperating with portions of the delivery tube to define an elongate, upwardly-extending generally arcuate air supply passage which is open at its upper end to receive ambient air; and
(b) the structure additionally defining communicating formation means for communicating the delivery passage with the air supply passage for establishing an aspiration effect to draw air from the air supply passage to the delivery passage as material flowing in a direction established by the delivery passage passes by the formation means.

15. The aspirator probe of claim 14 wherein the first and second structures are formed from a single piece of elongate tubing.

16. The aspirator probe of claim 15 wherein the single piece of tubing has been deformed as by folding a portion of its longitudinally-extending sidewall inwardly to define the delivery passage, and by utilizing the remainder of the sidewall in cooperation with the inwardly-folded sidewall portion to define the air supply passage such that it has a generally horseshoe-shaped cross section surrounding the delivery passage along a majority of the length of the delivery passage.

17. The aspirator probe of claim 14 wherein the ratio of the cross-sectional area of the delivery passage to the cross-sectional area of the air supply passage is about 1:3.

18. The aspirator probe of claim 14 wherein the first and second structures comprise first and second elongate tubes of unequal diameter and unequal length.

19. The aspirator probe of claim 18 wherein the communicating formation means includes at least one opening formed through a sidewall portion of the first structure at a location spaced from but in proximity to the lower end of the first structure.

20. The aspirator probe of claim 18 wherein the communicating formation means includes a relief formed on the lower end portion of the first structure.

21. The aspirator of claim 20 wherein the relief includes an end surface formed on the delivery tube and extending in a plane which is inclined relative to the plane of the lower end of the second structure at an angle of about 30 degrees.

22. The aspirator of claim 18 wherein the communicating formation includes a non-coextensive arrangement of lower ends of the delivery tube and the air supply tube.

* * * * *